United States Patent Office 2,736,639

Patented Feb. 28, 1956

2,736,639

SURFACE TREATMENT OF GERMANIUM

Ray C. Ellis, Jr., Allston, Mass., assignor to Raytheon Manufacturing Company, Waltham, Mass., a corporation of Delaware No Drawing. Application December 16, 1953, Serial No. 398,619

6 Claims. (Cl. 41—42)

This invention relates to the surface treatment of semiconductor materials and more particularly to chemical etchants as applied to germanium surfaces to improve the electrical characteristics thereof and to simplify the recovery of germanium from the etching solutions.

In preparing germanium for use in rectifiers, transistors, phototransistors and the like, the electrical characteristics of the final device are determined to a large degree by the surface condition of the germanium component utilized therein. It is well known that various combinations of chemical etching reagents can be used to clean the surface areas and remove lattice distortions from bodies of germanium. However, these etching solutions commonly contain an oxidizing agent and hydrofluoric acid or a fluoride in some form, and the resulting reaction in such an etching solution leaves that portion of the germanium which has been chemically removed from the principal germanium body in a tightly bound compound. Furthermore, special plastic containers, such as polyethylene containers, are needed to hold the fluoride etchants, and these solutions are relatively expensive. The value of germanium and the quantities used in the mass production of the above-mentioned devices make it quite important to recover germanium readily and economically from the etching solution. When fluoride etching solutions are employed, these recovery operations are quite involved. The invention herein described pertains to new etching solutions for germanium whereby the ease in handling the solution is facilitated, the cost of the solution is lowered, and the recovery of germanium is greatly simplified.

In the commercial manufacture of transistors, germanium single crystals can be grown by the so-called seed-pulling method, and by properly employing doping techniques to introduce certain impurities into the germanium melt, these single crystals can be made n-type or p-type, or they can contain junctions of the n-p or n-p-n type. In all cases, it is then necessary to cut the crystal into shapes suitable for device fabrication. The most common method employed to cut a crystal of germanium involves sawing the crystal into small dice or chips with a diamond impregnated metal wheel. To remove any superficial layer of disturbed material left on these chips by the mechanical preparation thereof, specific solutions suitable for etching germanium surfaces at predetermined rates are employed. As mentioned above, the known etches for germanium have in common a surface oxidant and a complexing agent, hydrofluoric acid, which dissolves the oxide as it is formed. As previously noted, it is necessary to use special containers to hold these fluoride etching solutions, and they are expensive as compared to the novel etching described below.

This invention involves the use of a polybasic acid selected from the group consisting of tartaric acid, citric acid and oxalic acid in combination with either hydrogen peroxide or nitric acid to etch germanium at a measurable controlled rate. As one example of a specific embodiment of this invention, a solution composed of a mixture of eight parts concentrated nitric acid by volume to three parts saturated tartaric acid by volume in water has been used to etch germanium at a rate of fifteen mils per hour at 100 degrees C. By increasing or decreasing the temperature and the concentration of these acids, the etching rate may be varied as desired. Another example of how these polybasic acids can be used to etch germanium is a mixture composed of two parts by volume of thirty per cent. hydrogen peroxide to one part by volume of saturated citric acid in water. This etching solution was found to thin germanium chips at a rate of two mils per hour at thirty-five degrees C.

Likewise, oxalic acid can be used with either nitric acid or with hydrogen peroxide to form a suitable etching solution for germanium. For example, one part by volume of nitric acid to one part by volume of oxalic acid in water will etch germanium at a rate of 2.2 mils an hour at thirty-five degrees C. Furthermore, it should be noted that tartaric acid and citric acid can also be interchangeably used in combination with either nitric acid or hydrogen peroxide to etch germanium at predetermined rates.

In the case of each of these possible combinations of etching solutions the recovery of germanium is greatly simplified. Also the etching solutions can be handled with greater safety and the containers employed can be made of glass, for example, rather than a plastic material as required when hydrofluoric acid etches are used. The cost of the novel etching solutions described above is relatively low and additional control agents are not needed to regulate the speed of the removal of material.

However, this invention should not be limited to the particular details described above as many equivalents will suggest themselves to those skilled in the art. For example, the concentration of the polybasic acid and the oxidizing agent used in each mixture can be varied as desired. Also the temperatures at which these solutions are employed can be changed to control the etching rate. Therefore, it is desired that the appended claims be given a broad interpretation commensurate with the scope of the invention within the art.

What is claimed is:

1. The method of improving the electrical characteristics of germanium bodies which consists in subjecting a germanium body to a fluid mixture from which excess germanium is readily reclaimable, said mixture being comprised of a polybasic acid selected from the group consisting of tartaric acid, citric acid, and oxalic acid, an oxidizing agent, and water, and then washing said fluid mixture from said body.

2. The method of improving the electrical characteristics of germanium bodies which consists in subjecting a germanium body to a fluid mixture from which excess germanium is readily reclaimable, said mixture being comprised of a polybasic acid selected from the group consisting of tartaric acid, citric acid, and oxalic acid, an oxidizing agent selected from the group consisting of nitric acid, and hydrogen peroxide, and water, and then washing said fluid mixture from said body.

3. The method of improving the electrical characteristics of germanium bodies which consists in subjecting a germanium body to a fluid mixture from which excess germanium is readily reclaimable, said mixture being comprised of tartaric acid, nitric acid, and water, and then washing said fluid mixture from said body.

4. The method of improving the electrical characteristics of germanium bodies which consists in subjecting a germanium body to a fluid mixture from which excess germanium is readily reclaimable, said mixture being comprised of citric acid, hydrogen peroxide, and water, and then washing said fluid mixture from said body.

5. The method of improving the electrical characteristics of germanium bodies which consists in subjecting a germanium body to a fluid mixture from which excess germanium is readily reclaimable, said mixture being comprised of oxalic acid, nitric acid, and water, and then washing said fluid mixture from said body.

6. The method as described in claim 3 wherein the tartaric acid is present in said mixture in a concentration of three parts by volume, and the nitric acid is present in said mixture in a concentration of eight parts by volume.

References Cited in the file of this patent

UNITED STATES PATENTS

| | | |
|---|---|---|
| 2,154,468 | Oplinger | Apr. 18, 1939 |
| 2,542,727 | Theurer | Feb. 20, 1951 |

OTHER REFERENCES

Sequestering Agents in Aluminum Etching by Prescott et al., Metal Finishing, Oct. 1953, pp. 65–67.